(No Model.)
C. E. HEALY.
CAR TRUCK AND BRAKE.
No. 459,748. Patented Sept. 22, 1891.
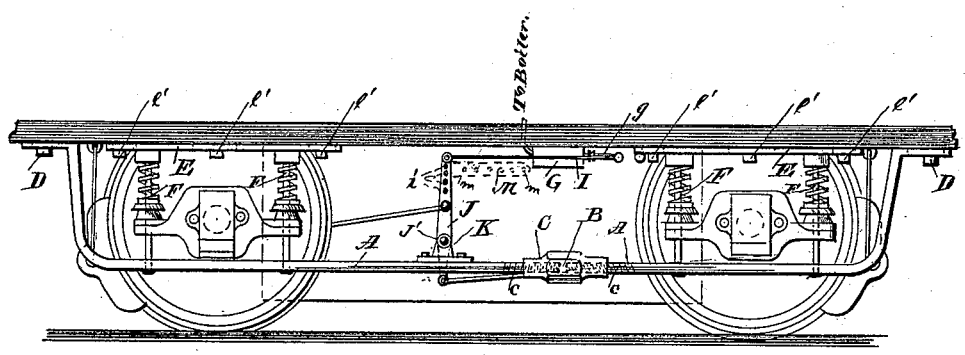
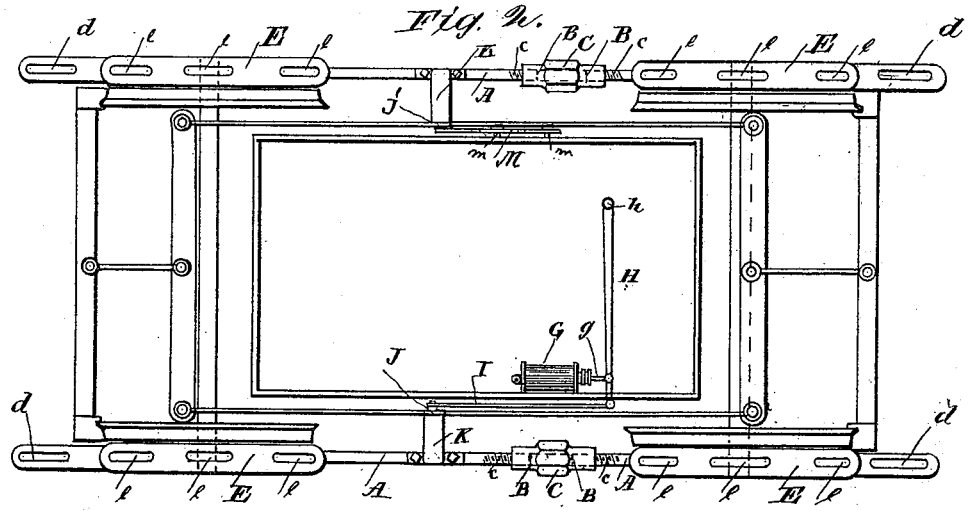
Witnesses
Inventor
Caleb E. Healy
by Wm. M. Monroe
Attorney

UNITED STATES PATENT OFFICE.

CALEB E. HEALY, OF NEW LONDON, OHIO.

CAR TRUCK AND BRAKE.

SPECIFICATION forming part of Letters Patent No. 459,748, dated September 22, 1891.

Application filed April 29, 1891. Serial No. 391,014. (No model.)

*To all whom it may concern:*

Be it known that I, CALEB E. HEALY, a citizen of the United States, and a resident of New London, county of Huron, State of Ohio, have invented certain new and useful Improvements in Motor Running-Gear and Brake Connections, of which I hereby declare the following to be a full, clear, and exact description, such as will enable others skilled in the art to which it appertains to make and use the same.

My invention relates to improvements in motor running-gear and brake connections.

The objects of the invention are to adapt the running-gear to chain gearing, as described in my previous patent of July 1, 1890, No. 431,115, and also adapting thereto and to connections with a steam-cylinder any common form of car-brake.

My invention consists in the adjustable parallel brace-rods connecting the journal-boxes of the running-gear and in the brake attachments and combination, arrangement, and construction of the various details, as hereinafter described, shown in the accompanying drawings, and more particularly pointed out in the claims.

In the accompanying drawings, Figure 1 is a side elevation in vertical section of the invention as applied to a car. Fig. 2 is a plan view of the same with the car-body removed.

In my former invention a steam-motor and gearing attached to the frame of the car, connecting by means of chain gearing with the driving-axles, is employed. It is found in practice that the chains vary in length from wear on account of use, and that some adjustment is required in the parallel braces connecting the journal-boxes of the car-axles, by which either car-axle may be separated from the other or both may be drawn nearer together or separated from one another, as desired. To accomplish this purpose the brace A, as shown in the drawings, is divided at some convenient point between the axles, as at B, the separate extremities being united by the elongated nut C, provided, as are the extremities B, by a right and left hand screw-thread, as *c*. The outer extremities of the portions of the brace A are secured by bolts D through slots *d* in such a manner that the portions will move easily in the direction of their length when the nuts of the bolts are loosened. The plate E also, to which the guiding-rods F, which support the axle-journals, are secured, are slotted at *e* to receive the attaching-bolts *e'* to the car-frame, so as to enable them to move in unison with the portions of the brace. It will be observed that if any alteration is necessary in the position of either axle it can be immediately made by loosening the bolts which secure the plate E adjacent to that axle and extremity of the brace of the car-frame at that end, and either one axle singly or both at a time can be moved as much as desired, or either end of either axle can be moved.

G in the drawings represents a small steam-cylinder, in which plays the piston *g*. This piston connects at its outer end with the vibrating arm H, pivoted at *h*. This arm also operates a connecting-rod I, attached at one end to the brake-lever J, which may be in any position desired, as in the common hand-brake, or in any usual position. The other mechanism of levers, equalizers, and brake-beams is seen to be a common form. The bearing K supports the lever J, (pivoted at *j'*,) placed upon the brace A.

In operation a pressure of steam in the cylinder will set the brake rigidly, and the degree of pressure can be varied both by the amount of steam admitted to the cylinder and by attaching the rod I to the brake-lever J at varying distances from the fulcrum *j*, as shown at *i* in Fig. 1.

It will be seen that this brake can be adapted to any form of car employing a steam-motor, and that no amount of desirable adjustment between the axles will interfere with its successful operation. To provide for this a lever *j'*, similar to J, is mounted upon the brace-bar at the opposite side of the car and connected in a similar manner with the equalizing-bar and brake-beam, but adjustably secured to the frame of the car by means of a light intermediate bar M, which can be secured at any point in its length by bolts *m'*. It will be seen that by moving this backward or forward the relative position of the brake-beams can be changed to suit any alteration in the position of the axles without altering the stroke of the brake-piston upon the other side of the motor.

I do not limit myself to the exact form of details as herein described, but include in my invention any such changes in construction as might be made by skilled mechanics in completing my device.

The mechanism herein described is equally applicable to compressed-air motors.

Having described my invention, what I claim as new, and desire to secure by Letters Patent, is—

1. In a motor running-gear, a divided brace-bar connecting the journal-bearings for the axles, slots at the outer extremities of the brace portions, and oppositely screw-threaded inner extremities, in combination with an elongated nut with corresponding thread, substantially as described.

2. In car running-gear, a divided brace-bar connecting the journal-bearings of the axles, slotted outer extremities to the brace portions, and slotted upper pedestal plates, substantially as described, in combination with oppositely-screw-threaded inner extremities to the brace portions and elongated nuts provided with corresponding screw-threads to those of the braces, substantially as described.

3. In car running-gear, a divided brace-bar, substantially as described, a bearing resting upon said brace-bar, a brake-lever pivoted in said bearing, a steam-cylinder, a piston traveling in said cylinder, a piston-rod, and a vibrating rod connected with the piston-rod and with a rod connecting with the brake-lever, substantially as described.

4. In brake mechanism, a steam-cylinder, a piston, and a vibrating rod connected with the piston at its outer end and also with a rod connecting with the brake-lever, the said rod being attachable to the lever at varying distances from the fulcrum-point, substantially as described.

5. In brake mechanism, a steam-cylinder and piston, a vibrating rod connected with the piston at its outer end and also with a rod connecting with the brake-lever J, pivoted in a bearing on the brace-bar, the said rod being attachable to the brake-lever at varying distances from the fulcrum-point, a corresponding brake-lever J' on the opposite side of the car and similarly mounted upon the brace-bar, brake-rods connecting the levers with equalizers, and an adjustable bar M, connected with the second lever J', substantially as described.

6. In running-gear for motors, divided brace-bars longitudinally adjustable at either end and centrally connected by elongated nuts, in combination with adjustable brake mechanism, substantially as described.

7. In running-gear for steam-motors, divided brace-bars longitudinally adjustable at either end and centrally connected by elongated nuts, in combination with a steam-actuated brake-lever mounted upon one brace-bar and a similar lever mounted on the opposite brace-bar, secured in position by means of the adjustable bar M', with brake-rods and equalizers connecting the said levers, all as and for the purpose set forth.

CALEB E. HEALY.

Witnesses:
WM. M. MONROE,
F. H. MOORE.